July 6, 1948.    E. M. McELHINNEY    2,444,575
COUPLING DEVICE
Filed Oct. 1, 1945    2 Sheets-Sheet 1
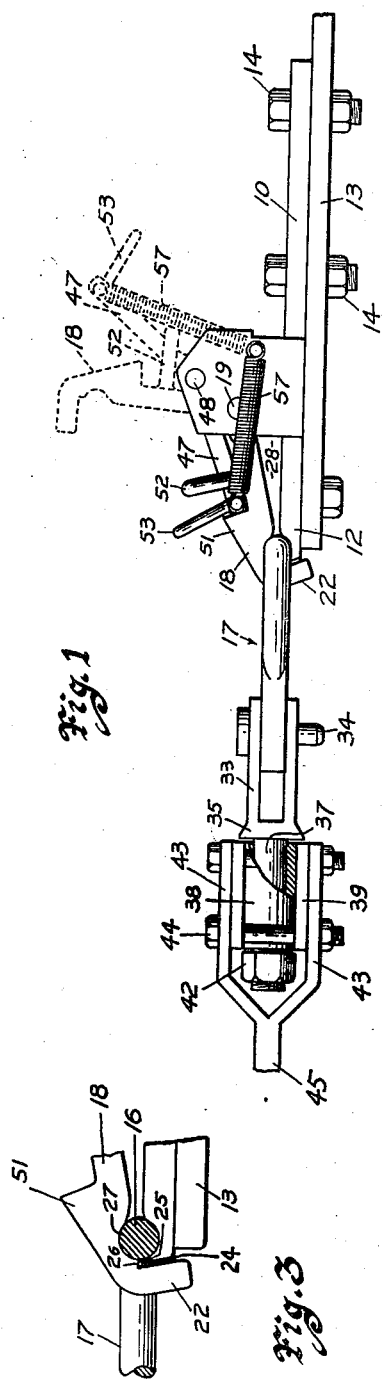
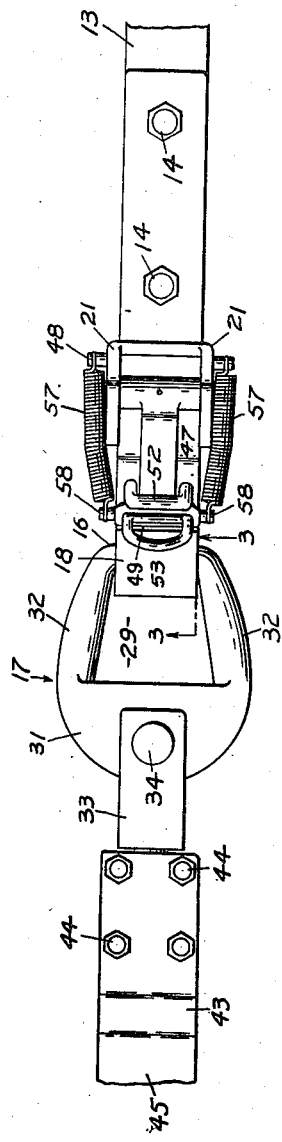
Inventor
Eric M. McElhinney
By Rudolph L. Lowell
Attorney July 6, 1948.  E. M. McELHINNEY  2,444,575
COUPLING DEVICE
Filed Oct. 1, 1945  2 Sheets-Sheet 2
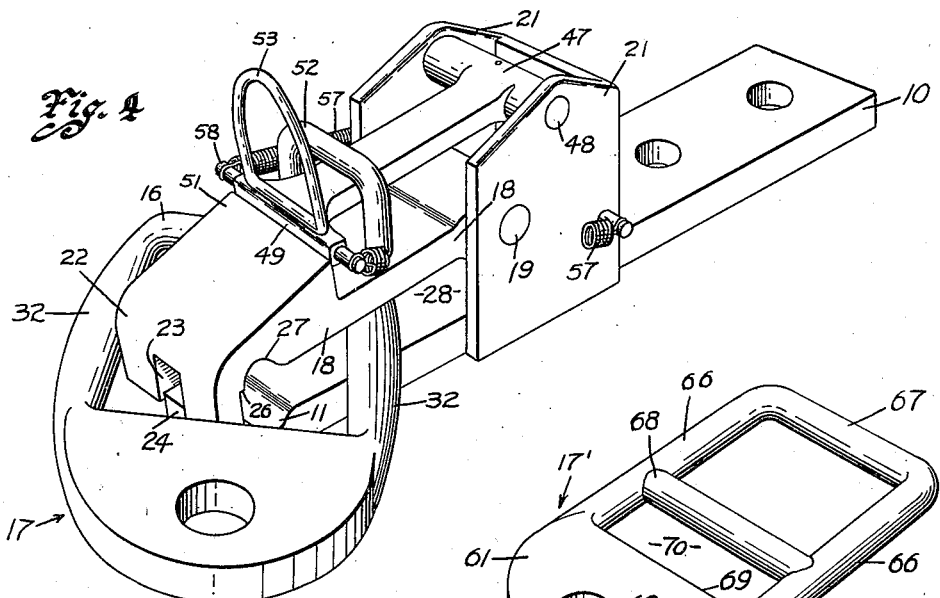
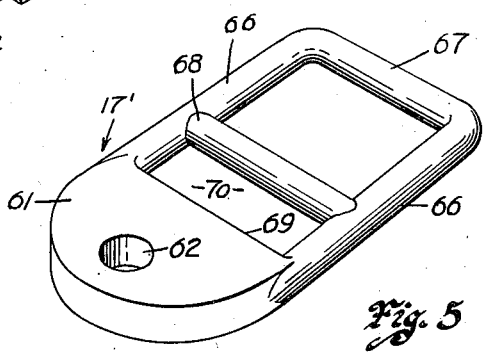
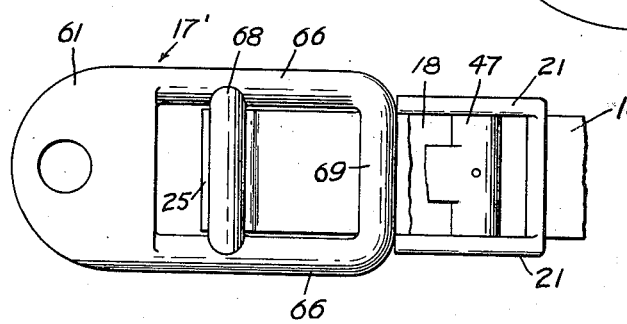
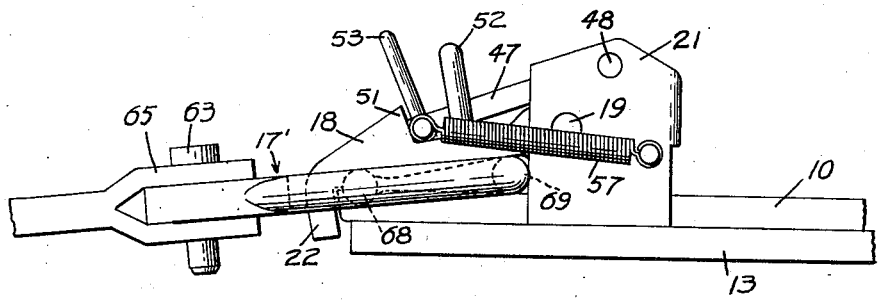
Inventor
Eric M. McElhinney
By Rudolph L. Lowell
Attorney Patented July 6, 1948

2,444,575

UNITED STATES PATENT OFFICE 2,444,575

COUPLING DEVICE

Eric M. McElhinney, Dysart, Iowa

Application October 1, 1945, Serial No. 619,561

4 Claims. (Cl. 280—33.15)

This invention relates generally to coupling devices and in particular to a coupling for connecting a trailer unit with a tractor unit.

It is an object of this invention to provide an improved coupling device.

A further object of this invention is to provide a coupling which is capable of maintaining a trailer unit and a tractor unit in positive connection for all relatively moved positions of the two units.

Yet another object of this invention is to provide a coupling which is continuously self-locking regardless of any wear which might occur in its locking mechanism.

Another object of this invention is to provide a coupling in which a pivoted latch, in a hitch locking position, is positively but releasably held against pivoted movement by any forces acting on the hitch.

A further object of this invention is to provide a coupling which is simple and rugged in construction, comprised of a minimum number of movable parts, positive in operation, and easily and quickly operated to locking and releasing positions.

A feature of this invention is found in the provision of a coupling device for a tractor unit and a trailer unit in which a coupling member on a first one of the units is of a construction to releasably pivotally support a hitch for up and down pivotal movement. The hitch in turn is pivotally connected for relative lateral movement with a rotary member, which is rotatably supported on the second one of the units for rotation about an axis extended substantially longitudinally of the coupling member on the first unit, whereby the two units are positively connected in all relatively moved positions.

Another feature of this invention is found in the provision of a coupling device which has a body member with a transverse groove adjacent one end, an upright support on one side, and a latch pivoted at one end on the support at a position spaced from the body member. The latch is provided with a hook at its opposite end adapted to close, in mating relation with the transverse groove, concurrently with the location of its free end across the one end of the body member. A hitch, including a pair of transverse longitudinally spaced members is positionable on the body member with one transverse member in the body member groove, and the second transverse member adjacent to the support. On movement of the latch to its hitch closing position, the latch moves against the second transverse member, concurrently with the hook locking the first transverse member in the body member groove, so that the hitch is locked in a fixed position on the body member.

A further feature of this invention is found in the provision of a coupling having a body member formed with a transverse groove adjacent one end to partially receive a portion of a hitch. A tension actuated latch pivoted on the body member is movable to a first position extended outwardly from the body member, and has a hook at its free end adapted, on movement of the latch to a second position, to form with the groove an annular bearing support in which the hitch portion is locked. With the latch in its first position, the hitch is initially located anywhere on the body member between the groove and the pivot support for the latch, and then with the latch resting on the hitch, the hitch is moved to its locked position on the application of a pulling force between the two units.

Another feature of this invention is found in the provision of a coupling having a flat body member with a transverse groove in one side for partially receiving a portion of a hitch, so that the hitch is removable from the groove on the application of a pulling force on the hitch. A pivoted latch is pivotally supported on the body member and has a portion movable into a coacting position with the groove to lock the hitch against removal from the body member, with a tension actuated locking means being provided to hold the latch against pivotal movement in its hitch locking position.

Further objects, features and advantages of this invention will become apparent from the following description when taken in connection with the accompanying drawings in which:

Fig. 1 is a side elevational view of the coupling device of this invention shown in a coupled position; and with certain parts broken away to more clearly show its construction;

Fig. 2 is a plan view of the coupling shown in Fig. 1;

Fig. 3 is a detail sectional view as seen on the line 3—3 in Fig. 2;

Fig. 4 is a perspective view of the coupling, with parts broken away, showing the hitch out of its coupled position, but adapted to be moved to a coupled position by the application of a pulling force thereon;

Fig. 5 is a perspective view of a modified form of the hitch;

Fig. 6 is a side elevational view of the coupling of this invention shown in coupled relation with the hitch shown in Fig. 5; and Fig. 7 is a fragmentary plan view of the coupling shown in Fig. 6, with certain portions broken away to more clearly show the assembly therein of the modified form of the hitch shown in Fig. 5.

Referring to the drawings the coupling of this invention is shown in Figs. 1, 2 and 4 as including a coupler unit having a flat body member 10 with a transversely extended groove 11, of an arcuate shape, adjacent its end 12. The body member 10 is illustrated in Figs. 1 and 2 as being supported on a longitudinally extended or swinging type drawbar 13 for a tractor (not shown), and connected to the drawbar by bolts 14. It is apparent, of course, that the free end of the drawbar may constitute the body member 10. The groove 11 is of a shape and size adapted to partially receive an end member 16 of a hitch, indicated generally as 17, so that the hitch member 16 is readily removable from the groove 11 on the application of a pulling force on the hitch.

In order to lock the hitch 17 against movement from the groove 11, while pivotally supporting the hitch at the groove for pivotal up and down movement, there is provided a pivoted latch 18 having one end pivoted at 19 between a pair of transversely spaced supports 21 extended upwardly from the top side of the body member 10. As clearly appears from Figs. 1 and 4, the pivot 19, for the latch 18, is at a position spaced upwardly from the top side of the body member 10, so that the latch, in a hitch locking position is inclined downwardly from its pivot 19 toward the body member end 12. A space 28 is thus provided between the pivoted end of the latch 18 and the body member 10 for a purpose which will appear later.

A hook or laterally bent member 22 at the free end of the latch 18 (Fig. 4) is formed with a recess 23 for receiving a lug or ear 24 extended longitudinally from the body member end 12, when the latch approaches and is in a hitch locking position. The inner wall of the free end of the hook 22 is formed with a shoulder 26 and a transversely extended groove 27 (Fig. 3). When the latch is in a hitch locking position the free end of the hook 22 extends over and across the end 12 of the body member 10, the grooves 27 and 11 in the hook and body member, respectively, are oppositely arranged and in a mating relation so as to form a closed annular bearing for pivotally supporting the hitch member 16, and the shoulder 26 is arranged oppositely from a lip portion 25 on the body member 10, located between the groove 11 and the end 12 of the body member.

The lip 25 and shoulder 26 are normally spaced apart from each other to provide for the grooves 11 and 27, in their mating relation, accommodating small diameter variations in the hitch member 16. Also in the event of any wear in the transverse grooves 11 and 27 a sidewall of the groove 11 adjacent to the end 12 of the body member will be maintained over long periods of use of the coupling. The lip 25 and shoulder 26 also cooperate to provide a full bearing surface for the hitch member 16 within the annular support formed by the grooves 11 and 27 in mating relation.

The hitch 17 (Figs. 2 and 4) is of a flat form and a substantially trapezoidal shape and has an opening 29 defined by the end member 16, a flat end member 31 and side members 32. The flat end 31 is receivable in a clevis 33 and is pivotally connected with the clevis by a bolt 34 extended through the clevis and an opening 36 in the flat end 31. The clevis 33 is provided at its closed end 35 with a longitudinally extended shaft 37 which is rotatably supported in a bearing unit comprised of a bearing sleeve 38 having oppositely arranged side plates 39 welded thereto. The clevis 33 is held against axial movement relative to the sleeve 38 by its closed end 35 and by a nut 42 which is threadable on the free end of the shaft 37 for contact engagement with the sleeve 38 and supporting plates 39. The bearing unit is initially assembled with the shaft 37 and the clevis 33, and is then positioned between a pair of supporting plates 43 provided on a tongue 45 or the like for a trailer unit (not shown). The plate members 39 are secured to the plate members 43 by bolts 44.

It is seen, therefore, that when the hitch 17 is in its locked position with the body member 10 it is pivotally movable in an up and down direction about its end 16 which is held against movement transversely of the body member 10 by the stop action of the hitch sides 32 with the hook 22. Relative transverse movement between the two connected units is permitted by the pivotal connection of the hitch with the clevis 33 at the pivot 34, while transverse tipping movement between the two connected units is accommodated by the rotatable support of the clevis shaft 37 on the trailer unit.

The hitch 17, as best appears in Figs. 2 and 4 is widest at its flat end 31 and tapers or converges toward the end member 16, so that the side members 32 are inclined toward each at the end member 16. It is thus seen that the opening 29 is of a trapezoidal shape having its widest side at the flat hitch end 31. This construction of the hitch 17 provides for the end member 16 being initially positionable on the body member 10 and out of the groove 11 when the tractor unit and the trailer unit are offset from each other, that is out of longitudinal alignment, and for the movement of the end member 16 within the grooves 11 and 27 when the tractor unit is later operated in a forward direction, as will be later fully explained. The opening 29 is of a size to loosely receive the hook 22 but with the hook being adapted for contact engagement with the hitch side members 32 when the hitch is in a locked position, to limit transverse movement of the hitch relative to the body member 10.

The latch 18 is positively locked in a closing position relative to the groove 11, in the body member 10, by means including a pivoted locking member 47 pivotally supported at 48 between the upright supports 21. As shown in Fig. 1 the pivot 48 is spaced upwardly from and to one side of the pivot 19 for the latch 18. The locking member 47 is of a substantially bar shape and on pivotal movement in a counter-clockwise direction, from the dotted line position shown in Fig. 1, is movable to a latch locking position superposed on the latch 18 and with its free end 49 engageable with an upstanding projection 51 formed on the top side of the latch 18.

With the latch 18 and the locking member 47 in their relative superposed positions (shown in Fig. 1), and with the hitch end 16 locked within the grooves 11 and 27 any force tending to move the latch in a clockwise direction, away from a hitch locking position is transmitted through the latch projection 51 to the locking member 47 and longitudinally of the locking member 47 to its pivotal support 48. This force is thus directed through the axial center of the pivotal support 48 so that there is no moment arm of the locking member 47 about its pivotal support or axis 48.

The locking member 47 is connected with the latch 18 through a lost motion mechanism comprising an inverted U-shaped member 52 arranged in a straddled relation with the locking member 47 and having its free ends secured to the top side of the latch 18. A manual grip 53 is extended upwardly from the free end of the lock 47. Thus to move the latch 18 out of its hitch locking position the handle 53 is gripped and the locking member 47 is initially moved in a clockwise direction, as viewed in Fig. 1, toward its dotted line position, also shown in Fig. 1, until its free end 49 is out of an engaging position with the latch projection 51. At this time the U member 52 is engaged by the locking member 47 and the latch and locking member are then simultaneously moved to their dotted line positions shown in Fig. 1.

It is seen, therefore, that with the locking member 47 and the latch 18 supported on pivots offset from each other, a relative longitudinal movement between these parts takes place concurrently with their pivotal movement through different arcuate paths by means of their lost motion connection through the U member 52. The lost motion connection thus provides for a predetermined relative movement of the latch and locking member to their respective hitch holding and latch locking positions, and for the lifting of the locking member 47 out of a latch locking position prior to the movement of the latch from a hitch locking position, all in response to the manipulation of the locking member 47 in reverse directions.

The locking member 47 is yieldably held in a latch locking position with the projection 51 by a pair of tension springs 57 arranged at opposite sides of the supports 21. Each spring 57 is connected at one end to the pivot 48 for the locking member 47 and at its opposite end to a lateral extension 58 at the free end 49 of the locking member 47. As seen in Fig. 1 the pressure of the springs 57, when the locking member 47 is in a latch locking position, is applied in a substantially horizontal plane and below the pivot 48 so that the free end 49 of the locking member 47 is continuously urged into engagement with the projection 51 on the latch 18. It is apparent, therefore, that the springs 57 are entirely free of any forces tending to move the latch 18 away from a hitch locking position, since such forces are applied through the locking member 47 to its pivotal support 48.

On movement of the locking member and latch to their relative positions shown in dotted lines in Fig. 1, the longitudinal axes of the springs 57 are moved upwardly through the pivotal support 48 so that the force of the springs is applied in a substantially upright plane and to the right of the support 48 to yieldably hold the latch and locking member away from a hitch locking position. The springs 57 thus function to alternately yieldably hold the locking member 47 in a latch locking position, and the locking member 47 and the latch 18 out of a latch locking position and a hitch locking position, respectively.

When the longitudinal axis of the end member 16 of the hitch 17 is substantially parallel to the transverse groove 11 it is apparent that the member will be readily received within the groove 11. In order that the hitch 17 can be initially connected when a side member 32 is in a parallel relation with the groove, or when the end member 16 is inclined transversely in a supported position on the body member 10, the side members 32 are inclined inwardly toward the end member 14, as was explained above, and of a size incapable of being individually received within the groove 11.

Thus with the latch 18 in its dotted line position shown in Fig. 1 the hitch 17 is positionable anywhere on the body member 10 between the upright supports 21 and the end 12 of the body member 10, and with the end member 16 out of a parallel relation with the transverse groove 11. The latch 18 is released from its dotted line position shown in Fig. 1 and permitted to be yieldably urged against the top of the hitch 17 by the action of the springs 57 as shown in Fig. 4. At this position of the hitch the hook 22 extends partially across the end 12 of the body member 10 and within the hitch opening 29, and the lug 24 is partially received within the recess 23 in the hook 22. In other words, the space 28 between the body member and the latch 18 is of a height to snugly receive a side or end member of the hitch 17 therein, concurrently with the location of the hook 22 relative to the body member 10 as above explained.

On a forward movement of the tractor, or on movement of the body member 10 to the right, as viewed in Fig. 4, the slanted arrangement of the side members 32 provides for a pivotal movement of the hitch 17 relative to the hook 22 until the end member 16 is in a substantially parallel relation with the transverse groove 11. When this occurs the end member 16 is moved to its position within the grooves 11 and 27 concurrently with the movement of the latch 18 to its hitch locking position, and the locking member 47 to its latch locking position in response to the action of the springs 57. As a result, even though the tractor and trailer may be out of longitudinal alignment when initially connected, the two units are positively and automatically connected as soon as the tractor is moved forwardly. In order to release the hitch 17 the locking member 47 and latch 18 are moved to their dotted line positions shown in Fig. 1, so that the hook 22 is clear of the body member 10. By virtue of the partial reception of the hitch end member 16 within the groove 11, the hitch is disconnected from the body member 10 on the application of a pulling force thereon. In one embodiment of the invention the groove 11 has a depth of $\frac{5}{16}$ inch and the end member 16 a diameter of ¾ inch. The largest portion of the end member 16 is thus received within the latch groove 27, while the groove 11 is incapable of holding the end member 16 for a substantially longitudinal pull.

In some instances of operation, such as in the pulling of a two wheel trailer, in which the tongue is supported on the tractor unit, the use of a hitch which is pivotally movable in an up and down direction is objectionable. However, this objection is eliminated by the provision of a modified form of hitch shown in Figs. 5, 6 and 7 and adapted for connection with the coupling shown in Fig. 1. Similar numerals of reference will be used, therefore, to designate like parts.

Referring to Fig. 5 the hitch 17' is of an integral construction having a flat end 61 with an opening 62 adapted to receive a usual hitch pin 63, for connecting the end 61 to a clevis 65 on a trailer tongue. Extended from one side 69 of the flat end 61 is a pair of transversely spaced longitudinal members 66 connected at their free ends by an end bar or member 67 and intermediate their ends by a second bar or transverse member 68. The opening 70 between the side 69 of the flat end 61 and the transverse bar 68 is of a size to loosely receive the hook 22 of the latch 18, while the distance between the bars 67 and 68 provides for the end bar 67 being adjacent to the upright supports 21 when the second bar 68 is received within the transverse grooves 11 and 27.

Thus as shown in Figs. 6 and 7, when the hitch 17' is positioned on the body member 10, and the latch 18 is in its hitch locking position, the side members 66 are arranged at opposite sides of the body member 10 between its end 12 and the supports 21, concurrently with the location of the transverse bar 68 within the grooves 11 and 27, and the location of the end transverse bar 67 in contact engagement with the bottom side of the latch 18, the top side of the body member 10 and one side of the supports 21. Since the latch 18 is positively held against pivotal movement in a clockwise direction, as viewed in Fig. 7, by the locking action of the locking member 47, the hitch 17' is positively held in a fixed position relative to the body member 10. As a result any pivotal movement of the hitch 17' is positively eliminated, and the hitch functions as an extension of the body member 10 to support any trailer unit connected therewith at its flat end 61.

In the event the coupling is to be connected to a plow or the like the hitch 17' may be formed with a loop portion connecting the sides 66 in place of the flat end 61, and a chain or the like extended through the loop for connection with the hitch 17'.

Athough the hitches 17 and 17' have been described as being on a trailer unit and the body member 10 on a tractor unit, it is to be understood that these parts can be relatively used on either unit. It is to be understood also that although only a preferred embodiment of the invention has been illustrated and described herein the invention is not to be so limited, since modifications and changes can be made therein which are within the full intended scope of the invention as defined in the appended claims.

I claim:

1. A coupling device for a tractor unit and a trailer unit including a flat body member carried on one of said units and having a transversely extended arcuate groove adjacent one end thereof for receiving a portion of a hitch carried on the other of said units, an upright support on said body member, a projection extended longitudinally from said one end of the body member, a pivoted latch pivotally supported at one end on said upright support at a position spaced from said body member, and having a lateral projection at its other end movable across the one end of said body member, with said lateral projection having a recess therein adapted to receive said longitudinal projection on said body member, when the latch is in one of its pivotally moved positions, said other end of the latch having a transversely extended annular groove spaced inwardly from said projection, with said two grooves, when said latch is in said one position, being in mating relation to form an annular support for said hitch portion to lock said hitch portion therebetween, with said latch in a second moved position being in a substantially upright position whereby to release said hitch portion between said two grooves, and means for releasably locking said latch in said one position, said latch in said one position being inclined relative to said body member to provide for the hitch portion being initially positionable on said body member between said body member groove and said upright support and movable into said body member groove on the application of a pulling force between said two units.

2. A coupling device for a trailer unit and a tractor unit comprised of a flat body member adapted to have one end supported on one of said units, said body member having a transverse groove adjacent the opposite end thereof adapted to receive a portion of a hitch carried on the other of said units so that said hitch portion is removable from said groove on the application of a pulling force between said two units, a projection extended longitudinally from said opposite end of the body member, an upright support on said body member, a pivoted latch for locking said hitch portion in said groove pivotally supported at one end on said support at a position spaced from said body member, said latch being pivotally movable in one direction to a hitch locking position, and in an opposite direction to a substantially upright position, a laterally extended portion at the free end of said latch movable across the opposite end of said body member and having a recess therein adapted to receive said end projection on the body member, with said latch having a transverse groove therein adjacent to said lateral portion for receiving said hitch portion when the latch is in its hitch locking position, means including tension means for moving and releasably locking said latch in said hitch locking position, said hitch portion, when the latch is in said substantially upright position, being positionable on that part of the body member between its opposite end and said upright support and, when said latch is moved into engagement therewith, being movable to a locked position between said two transverse grooves on an application of a pulling force between said two units.

3. A coupling device for a tractor unit and a trailer unit comprised of a flat body member having one end adapted for support on one of said units and a transverse groove in its top side adjacent its opposite end for receiving a portion of a hitch carried on the other of said units, said groove being of a depth such that said hitch portion is removable therefrom on the application of a pulling force between said two units, a pivoted latch pivotally supported at one end at a position spaced upwardly from the top side of said body member for pivotal movement to a first position for locking said hitch portion in said groove, and to a second position extended upwardly from said body member top side, with the latch, in said first position, being inclined downwardly from its one end toward said opposite end of the body member, a hook at the other end of said latch having its free end portion movable across said opposite end of the body member, said hook free end portion being of a length such that it is positioned at said opposite end of the body member when the hitch is located out of said groove and between the latch and said body member, and means including tension means for moving and releasably locking said latch in said first position, with said hitch portion, in a position on said body member and out of said groove, and with said latch in a released position on the top thereof, being movable to a locked position within said groove and said hook on the application of a pulling force between said two units.

4. A coupling device for a tractor unit and a trailer unit including a body member adapted to be supported at one end on one of said units and having a transverse groove in one side adjacent its opposite end, an upright support on the one side of said body member, a pivoted latch pivotally supported at one end on said support at a position spaced upwardly from said body member one side, and having a hook at its free end movable into and out of a mating position with said transverse groove and forming with said groove an annular bearing support, with the free end of the hook, in said mating position being extended across the opposite end of said body member, and the pivoted end of the latch, at said mating position of the hook, being spaced upwardly from the one side of said body member, a one piece hitch having a portion connectible with the other of said units, a pair of transversely spaced members extended longitudinally from said hitch portion, a first transverse member connected between the free ends of said longitudinal members, and a second transverse member connected between said longitudinal members at a position inwardly from said first transverse member, said first transverse member being receivable in the space between said latch and said body member, and in contact engagement with said support, said latch and said body member, when said second transverse member is within said annular support, whereby said hitch is locked against movement relative to said body member, and means for releasably locking said latch against pivotal movement when the hook is in said mating position.

ERIC M. McELHINNEY.

REFERENCES CITED

The following references are of record in the file of this patent:

UNITED STATES PATENTS

| Number | Name | Date |
|---|---|---|
| 1,073,651 | Wixcel | Sept. 23, 1913 |
| 1,398,547 | Graham | Nov. 29, 1921 |
| 1,412,834 | Bleoo | Apr. 18, 1922 |
| 1,832,042 | Mohr | Nov. 17, 1931 |